United States Patent [19]

Raizner, deceased et al.

[11] 3,894,093

[45] July 8, 1975

[54] PROCESS FOR THE MANUFACTURE OF ADDITION PRODUCTS OF ETHYLENE OXIDE AND COMPOUNDS CONTAINING MOBILE HYDROGEN

[75] Inventors: Friedrich Raizner, deceased, late of Hofheim, Taunus, Germany, by Ilse Sofie Raizner nee Klotz, heiress; Ulfert Onken, Fischbach, Taunus, Germany; Horst Schrader, Frankfurt am Main, Germany; Werner Wellbrock, Neuenland, Taunus, Germany

[73] Assignee: Hoechst Aktiengesellschaft, Frankfurt am Main, Germany

[22] Filed: Aug. 1, 1973

[21] Appl. No.: 384,547

Related U.S. Application Data

[63] Continuation of Ser. No. 54,214, July 13, 1970, abandoned.

[30] Foreign Application Priority Data

July 13, 1970 Germany.......................... 1636046

[52] U.S. Cl....... 260/613 B; 260/615 B; 260/584 B; 260/573; 260/609 F; 260/609 R; 260/488 R; 260/476 R

[51] Int. Cl............................................ C07c 41/02
[58] Field of Search......... 260/613 B, 615 B, 584 B, 260/573, 609 F, 609 R, 488 R, 476 R

[56] References Cited

OTHER PUBLICATIONS

Schonfeldt, Surface Active Ethylene Oxide Adducts, (1969), pages 108–109 and 128,
Schmieder, U.S. Dept. of Comm., Office of Tech. Serv., P.B. Rep't. 70,344 (16,231–16,235).

*Primary Examiner*—Bernard Helfin
*Attorney, Agent, or Firm*—Curtis, Morris & Safford

[57] ABSTRACT

Polyethylene glycol ethers are obtained in great purity and high yields when liquid ethylene oxide is fed into a turbulent stream of the catalyst-containing starting material and the reaction mixture is passed through a mixing device and, subsequently, through a heat exchanger. As the mixing device, e.g., a Venturi type mixer can be employed.

2 Claims, 1 Drawing Figure

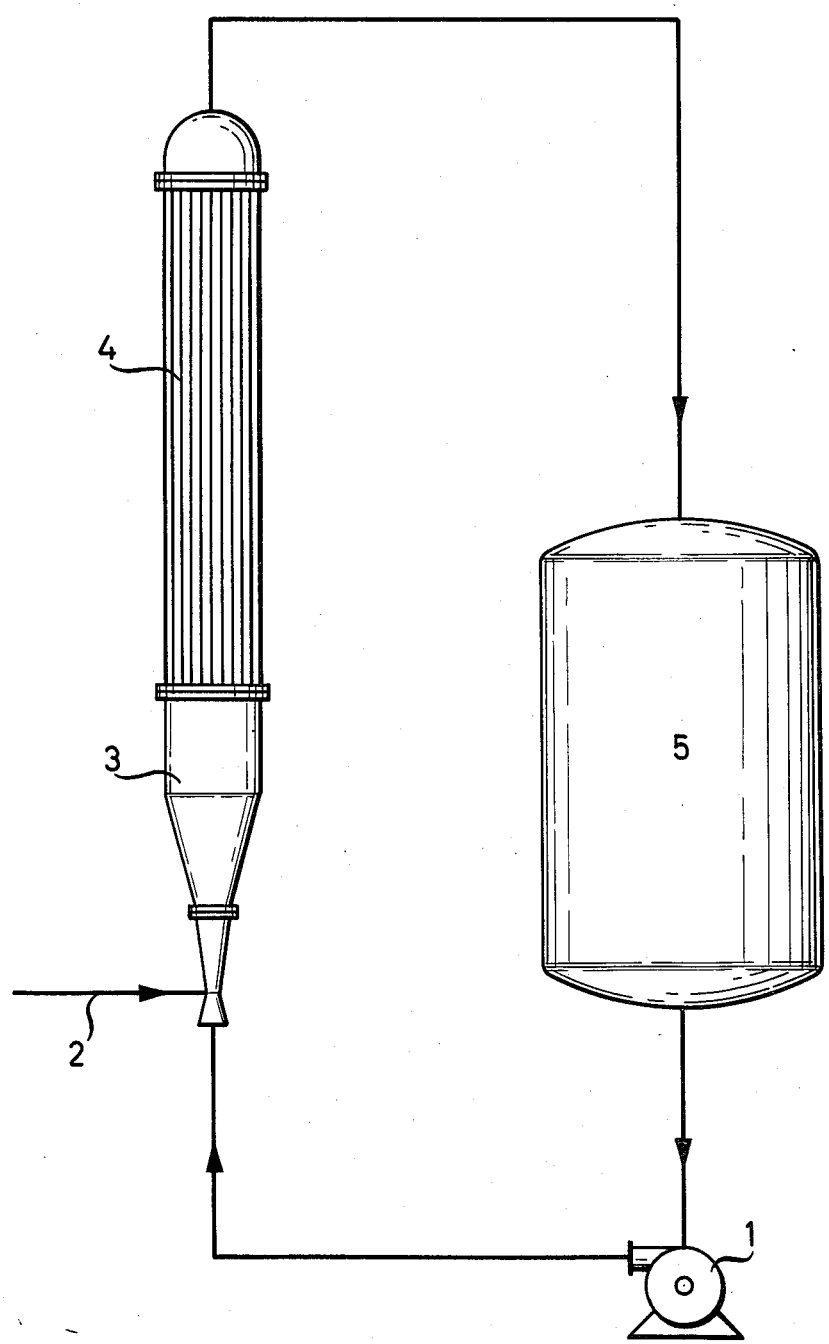
INVENTORS
FRIEDRICH RAIZNER
BY ILSE SOFIE RAIZNER, ADMINISTRATRIX
ULFERT ONKEN
HORST SCHRADER
WERNER WELLBROCK

PROCESS FOR THE MANUFACTURE OF ADDITION PRODUCTS OF ETHYLENE OXIDE AND COMPOUNDS CONTAINING MOBILE HYDROGEN

This is a continuation of application Ser. No. 54,214, filed July 13, 1970, and now abandoned.

The present invention relates to a process for the manufacture of addition products of ethylene oxide and compounds containing mobile hydrogen, in which the reaction mixture is recycled in the course of the reaction while flowing through a heat exchanger. The products obtained by this process are non-ionic surface-active compounds.

By "compounds containing mobile hydrogen" there is to be understood compounds of the formula $$R - X - H$$

wherein

R represents a saturated or unsaturated aliphatic radical, in particular a fatty alkyl-, fatty alkenyl- or fatty acyl radical, or optionally a substituted aromatic radical, in particular an alkyl phenyl radical, and X represents oxygen, nitrogen or sulfur.

As is well-known, in the presence of basic catalysts, the example sodium hydroxide, compounds of this type and ethylene oxide with the formation of substituted ω-hydroxy-polyethylene glycol ethers according to the formula $$R - X - (C_2H_4O)_n - H.$$

The reaction is strongly exothermic.

Polyethylene glycol ethers of the type described above are generally prepared in agitator vessels which are provided with cooling jackets and cooling coils to dissipate the heat of reaction evolved. In this method, the limits set to the dissipation of heat are, of course, the narrower the larger the vessel in each individual case because the available cooling surface area does not increase to the same extent as the volume of the vessel. the space-time yield is, therefore, limited.

The cooling effect is improved when employing one of the previously proposed cyclic systems. The apparatus used in this system consists essentially of a circulating system with a large reaction vessel and a heat exchanger installed outside the reaction vessel. The material to be reacted is atomized into the reaction vessel, and the liquid ethylene oxide is metered in simultaneously. In this process, the intermingling of the reactants is little intensive whereby the reaction period is prolonged and the space/time yield diminishes.

Now we have found that addition products of ethylene oxide and compounds containing mobile hydrogen can be obtained in a high space-time yield and in an especially good quality in a process in which the material to be reacted is conducted in a cycle and in which the heat of reaction is dissipated by a heat exchanger installed in the cyclic system, through which heat exchanger the reaction mixture flows continuously, which comprises feeding the ethylene oxide in the liquid state into a turbulent stream of the material to be reacted and passing the reaction mixture so obtained through a mixing chamber and, immediately thereafter, through a heat exchanger.

In this method, the Reynolds number of the stream should, at least in the zone of the introduction of the ethylene oxide, be higher than 2,300.

By feeding the ethylene oxide into the turbulent stream of the liquid, it is very rapidly distributed across the whole cross-section of the stream. The reaction sets in immediately at the point of inlet and proceeds in the reaction mixture as the latter passes through the mixing chamber and the heat exchanger. Moreover, part of the ethylene oxide evaporates in the mixing chamber so that the turbulence and, thereby, the mixing effect is enhanced. The mixing effect of the vapor bubbles is still maintained in the heat exchanger whereby the transmission of heat is substantially improved. It is especially advantageous to use a heat exchanger comprising a nest of boiler tubes.

Side reactions are largely avoided when working according to the process of the invention. With high space-time yields, the process yields products of a very good quality.

The present invention will now be described in greater detail by way of example only with reference to the accompanying drawing, which illustrates a device for carrying out the process of the invention.

The catalyst-containing starting substance, which has been dried in vacuo and which has been freed of dissolved oxygen, for example nonyl phenol, is circulated by a pump 1.

In an atomizing nozzle 2, liquid ethylene oxide in a finely divided form is fed into the recirculated liquid, the ethylene oxide mixing intensively with the recirculated liquid in the diffuser of a mixing chamber 3. From the mixing chamber 3, the mixture flows through a heat exchanger 4 in which a substantial part of the reaction takes place and the heat liberated during the reaction is dissipated. Prior to the reaction, i.e., before the introduction of ethylene oxide starts, the heat exchanger 4 is heated, for example with steam, to heat the starting substance to the reaction temperature.

After the heat exchanger 4, the reaction mixture flows into a vessel 5 which only serves as a collecting vessel for the increased volume of the reaction mixture, which increase is due to the addition reaction with the ethylene oxide. Thus, at the beginning of each batch operation, the vessel 5 is almost empty; such an amount of the starting substance must, therefore, be placed in the system that the total remaining cyclic system, with operating circulating pump, is filled with liquid. In the course of the reaction, the level of the liquid in 5 rises in accordance with the addition of the ethylene oxide. The reaction conditions remain constant during the process.

The atomizing nozzle 2 consists, for example, of a Venturi type mixer into which ethylene oxide flows at the narrowest cross-section through externally installed nozzles. However, it is also possible to use other devices to achieve fine distribution of the ethylene oxide. The heat exchanger 4 comprises advantageously a nest of boiler tubes.

The conveying capacity of the pump must be such that the circulating liquid is in a state of turbulence at the ethylene oxide inlet 2, i.e., the Reynolds number of the stream should be greater than 2,300. Within this limit, the conveying capacity of the circulating pump is largely independent of the introduced amount of ethylene oxide.

The following Examples illustrate the invention, the percentages being by weight:

1. Addition reaction of an average of 10 moles ethylene oxide/mole nonyl phenol 4,000 kg of nonyl phenol containing 0.2% of sodium hydroxide as the catalyst, were placed in the collecting tank and dried in vacuo at 110°C with operating circulating pump. Then ethylene oxide was introduced over the course of 1.8 hours at the rate of 4,500 kg/hour under a pressure of 4 atmospheres gage. The temperature of the reaction mixture rose to 160°C and was maintained at this level. After cooling with the exclusion of air and neutralizing with 6 to 7 kg of acetic acid, 12,000 kg of the final product were obtained in the form of a water-clear liquid which contained at most 0.5% of polyethylene glycol as a by-product. The space-time yield amounted to 6,000 kg/l.h. When the operation was carried out using conventional methods, the reaction period amounted to 5 hours with a space-time yield of 2,900 kg/l.h. Approximately 2% of polyglycol accrued as a by-product.

2. Addition product of an average of 10 moles ethylene oxide/mole tallow fat alcohol.

In the collecting tank, 0.2% of sodium hydroxide as the catalyst were added to 4,230 kg of tallow fat alcohol and, after starting the circulating pump, the whole was dried in vacuo at 110°C. At 150°C, 4,000 kg/hour of ethylene oxide were introduced under pressure of 4 atmosphere gage over the course of 2¼ hours. After cooling with the exclusion of air, 13,200 kg of the final product were obtained in the form of a water-clear liquid which contained at most 1% of polyglycol as a by-product. The space-time yield amounted to 5,200 kg/l.h. When working according to conventional methods, the reaction period amounted to 6.3 hours and the space-time yield to 2,100 kg/l.h. 3–4% of polyglycol accrued as a by-product.

We claim:

1. In a process for the manufacture of addition products of ethylene oxide and compounds containing mobile hydrogen, in which process the material to be reacted with the ethylene oxide is recycled in the course of the reaction and in which the reaction heat is abstracted by means of a tubular heat exchanger installed in the cyclic system, through the tubes of which heat exchanger the material to be reacted flows in a continuous stream, the improvement which comprises feeding the ethylene oxide in an atomized liquid state into a turbulent liquid stream of the material to be reacted and in a direction substantially perpendicular to the direction of flow of said liquid stream, passing the reaction mixture so obtained through a mixing chamber at a temperature and pressure to cause a portion of the ethylene oxide to vaporize in said chamber, and immediately thereafter passing the reaction mixture containing vapor bubbles through the tubes of said heat exchanger to remove heat of reaction therefrom.

2. Process as claimed in claim 1, in which the Reynolds number of the stream, at least within the zone of introduction of the ethylene oxide, is greater than 2300.

* * * * *

UNITED STATES PATENT AND TRADEMARK OFFICE
CERTIFICATE OF CORRECTION

PATENT NO. : 3,894,093
DATED : July 8, 1975
INVENTOR(S) : Raizner et al.

It is certified that error appears in the above-identified patent and that said Letters Patent are hereby corrected as shown below:

In Item [30] of the Heading, the filing date and number of the German Application should read -- July 16, 1969   Germany 1936046 --.

Signed and Sealed this seventh Day of October 1975

[SEAL]

Attest:

RUTH C. MASON
*Attesting Officer*

C. MARSHALL DANN
*Commissioner of Patents and Trademarks*